United States Patent
De Sequeira Serra Nunes

(10) Patent No.: US 8,852,338 B2
(45) Date of Patent: Oct. 7, 2014

(54) CEMENTITIOUS BINDERS AND WOOD PARTICLES-BASED INCOMBUSTIBLE COLOURED COMPOSITE PANEL WITH STRUCTURAL HIGH PERFORMANCE

(71) Applicant: Secil-Companhia Geral de Cal e Cimento, S.A., Lisbon (PT)

(72) Inventor: Angela Maria Jesus De Sequeira Serra Nunes, Azeitão (PT)

(73) Assignee: Secil-Companhia Geral de Cal e Cimento, S.A., Lisbon (PT)

( * ) Notice: Subject to any disclaimer, the term of this patent is extended or adjusted under 35 U.S.C. 154(b) by 0 days.

(21) Appl. No.: 14/063,814

(22) Filed: Oct. 25, 2013

(65) Prior Publication Data

US 2014/0047997 A1     Feb. 20, 2014

Related U.S. Application Data

(63) Continuation of application No. 13/678,859, filed on Nov. 16, 2012, now abandoned.

(30) Foreign Application Priority Data

Nov. 16, 2011 (PT) .......................... 106007

(51) Int. Cl.
| | | |
|---|---|---|
| *C04B 28/04* | (2006.01) | |
| *C04B 7/02* | (2006.01) | |
| *C04B 7/04* | (2006.01) | |
| *C04B 18/26* | (2006.01) | |
| *C04B 28/14* | (2006.01) | |
| *E04C 2/04* | (2006.01) | |
| *E04C 2/10* | (2006.01) | |
| *E04B 1/94* | (2006.01) | |
| *C04B 111/28* | (2006.01) | |

(52) U.S. Cl.
CPC ................. *C04B 28/04* (2013.01); *C04B 28/14* (2013.01); *E04B 1/942* (2013.01); *C04B 2111/28* (2013.01); *E04C 2/044* (2013.01); *C04B 7/02* (2013.01); *C04B 2201/32* (2013.01)
USPC ........ 106/731; 106/780; 106/805; 428/294.7; 428/703

(58) Field of Classification Search
USPC ................ 106/731, 780, 805; 428/294.7, 703
See application file for complete search history.

(56) References Cited

U.S. PATENT DOCUMENTS

| | | | |
|---|---|---|---|
| 3,827,895 A * | 8/1974 | Copeland | ....................... 106/708 |
| 5,135,805 A | 8/1992 | Sellers et al. | |
| 5,320,677 A | 6/1994 | Baig | |
| 5,342,566 A | 8/1994 | Schafer et al. | |
| 6,221,521 B1 | 4/2001 | Lynn et al. | |
| 8,070,876 B1 * | 12/2011 | Jiang | ............................. 106/700 |

FOREIGN PATENT DOCUMENTS

JP      2001-89206 A  *  4/2001

* cited by examiner

*Primary Examiner* — Anthony J Green
(74) *Attorney, Agent, or Firm* — Pearl Cohen Zedek Latzer Baratz LLP

(57) ABSTRACT

A composite panel is made from wood and cementitious binders, with flat surfaces and several possible colors. The panel comprises 35 to 85% of grey or white Portland cement; 10 to 30% of debarked resinous wood particles; 5 to 20% of semi-hydrated calcium sulphate; 0 to 10% of a surface accelerator; 0 to 10% of aluminum sulphate solution; 0 to 30% of calcium carbonate; and 0 to 15% of pigments. The process of preparation for the existing VIROC panel is adjusted to the new material. This panel, in addition to being very resistant and showing high performances in terms of resistance to impact, humidity, temperature variation, noise and fungi, as well as other microorganisms, also complies with all the requirements of the associated product standard.

11 Claims, No Drawings

CEMENTITIOUS BINDERS AND WOOD PARTICLES-BASED INCOMBUSTIBLE COLOURED COMPOSITE PANEL WITH STRUCTURAL HIGH PERFORMANCE

CROSS REFERENCE TO RELATED APPLICATION

This application is a continuation of U.S. patent application Ser. No. 13/678,859, filed Nov. 16, 2012, now abandoned, which claimed priority from Portuguese Patent Application No. 106007, filed Nov. 16, 2011, each of which is incorporated herein in its entirety.

FIELD OF THE INVENTION

This invention relates to a new type of incombustible cement wood, its use allowing an increased safety of the buildings against fire action, simultaneously providing the remaining properties of high durability, mechanical strength, acoustic behaviour and aesthetical interest, which are usual for this kind of material.

It allows a wide variety of applications, from pavements, ceilings, roofings, to coating and insulation of building façades, and the like.

BACKGROUND OF THE INVENTION

Although the panels or coatings made from solid wood or wood derivatives have a high bending strength, such as in the case of plywood, medium density fiberboards (MDF) or particle boards (OSB), they also have a low performance in terms of water resistance, dimensional stability, in addition to high susceptibility to attacks from fungi, insects and microorganisms, as well as low performance in what concerns its reaction to fire (in most cases with a classification equivalent to euroclass D).

The currently existing cement wood panels, which are commercially referred to as "VIROC", offer some advantages when compared to the aforementioned ones, since the mechanical performance and durability were already guaranteed by the presence of Portland cement in their composition. However, their classification as regards the fire action does not allow the degree of incombustibility to be achieved, being generally rated with no more than Class B.

On the other side, the U.S. Pat. No. 6,221,521 B1 discloses a process wherein semi-hydrated or anhydrous gypsum is used and reinforced with organic fibers containing additives such as potassium sulphate, in order to provide multilayer panels, and which is classified as incombustible according to ASTM E 136.

The U.S. Pat. No. 5,320,677 discloses another process wherein a mixture of fluidized gypsum with cellulose fibers is heated under pressure, being then subject to cooling in order to produce a panel with the desired conformation, although with a reference to gypsum calcination.

The U.S. Pat. No. 5,342,566 is in line with the previous ones, however it comprises the use of light-weight fillers, such as perlite, combined with gypsum and cellulose fibers, for the production of multilayer panels. In the U.S. Pat. No. 5,135,805, the possibility to use fibers of different origins is mentioned, such as glass or another mineral, and/or polypropylene in percentages ranging from 10 to 20%. All of these panels are considered incombustible according to ASTM E 136, but their formula does not contain cement and that is the reason why they have a limited scope of application, particularly in what concerns demands of a structural nature and exposure to outer environment.

DETAILED DESCRIPTION OF THE INVENTION

Technical Problem and Devised Solution

The main advantage of the invention is based in the fact that it is an incombustible panel, without generating incandescent drops and with a reduced smoke production, thus helping to minimize the risk of fire deflagration and propagation in the buildings and therefore contributing to an increased safety of people and property in case of fire. Simultaneously, it shows a good performance in terms of thermal and acoustic behaviour, resistance to impact, tensile and bending strength, resistance to humidity, as well as stability from the dimensional point of view and resistance to fungi, insects and microorganisms, in addition to being economically competitive and very easily applied. Considering all of these characteristics, it can be used in a wide variety of domains, inclusively with structural and architectural functions in inner and outer spaces.

Its composition is aimed at minimizing the incorporation of organic matter in the form of wood chips in order to not compromise the panel's mechanical strengths (in special, the bending strength), and the combination of the calcium sulphate in the form of semi-hydrate with the cement, according to the carefully determined proportions so as to control eventual expansive reactions which might be generated, provides a very good behaviour as regards fire, causing the material to be incombustible. This new benefit significantly increases the scope of application of the product and improves the behaviour of buildings under the action of fire.

Object of the Invention

Therefore, the object of this invention is an incombustible composite panel of high performance, made of Portland cement, gypsum and wood particles, comprising in weight percentage of the components with reference to the total weight of the composition:
1) 35 to 85% of grey or white Portland cement;
2) 10 to 30% of debarked resinous wood particles;
3) 5 to 20% of semi-hydrated calcium sulphate;
4) 0 to 10% of a surface accelerator;
5) 0 to 10% of aluminium sulphate solution;
6) 0 to 30% of calcium carbonate; and
7) 0 to 15% of pigments.

The resinous wood which is commonly used to obtain the component 2) is pinewood.

Preferably, the wood particles used therein are in the form of chips.

In general, the thickness of the said chips ranges from 0.25 to 0.32 mm.

In the preferred embodiments, 50 to 70% of the said chips, preferably about ⅔, are <1 mm long and 26 to 40%, preferably about ⅓, have a length of 1 to 4 mm.

Usually, the percentage of the component 3) is of about 11%.

Preferably, the surface accelerator being used as the component 4) is a sodium silicate solution with a density between 1.10 and 1.15 g/cm$^3$, wherein the sodium silicate has a SiO$_2$/Na$_2$O ratio between 3.19 and 3.53.

The aluminium sulphate which is used as the component 5), normally has a density ranging from 1.05 to 1.10 g/cm$^3$.

The calcium carbonate being used as the component 6) is generally limestone filler, which is the result of the fine grinding of lime materials.

The pigments being commonly used as the component 7) are metal oxide pigments.

The composite panel according to the invention pertains to Class A in compliance with ASTM E 136 and to Class A2 in compliance with EN 13501-1 and DIN 4102, having a good performance in terms of mechanical strengths, generally with a tensile strength under bending >9 N/mm$^2$ and a tensile strength perpendicular to the plane >0.5 N/mm$^2$, elasticity modulus >4000 N/mm$^2$ and thermal conductivity <0.23 W/m$^2$·K.

Experimental Part

This formula aims both at minimizing the incorporation of wood chips and introducing a mixture of binders with the incorporation of Portland cement and semi-hydrated calcium sulphate, in order to ensure the characteristic minimum bending strength above 9 N/mm$^2$.

The cements used are grey or white Portland cements, depending on the desired colour of the panel and according to the EN 197-1, which present fast-developing strengths (designation "R" of the relevant standard).

The use of gypsum, in the form of semi-hydrated calcium sulphate in controlled percentages, will not only provide the mixture with an acceleration of the setting process, but also an improvement of the panel's thermal behaviour and fire resistance.

The wood chips used, which can be from pinewood or other resinous wood, are then broken and thinned to the following dimensions:

TABLE 1

Characteristics of the wood chips

| Thickness (mm) | Length (mm) | | |
|---|---|---|---|
| | Fraction % <1 mm | Fraction % [1; 4] mm | Fraction % >4 mm |
| 0.25 and 0.32 | 50-70 | 46-26 | 4 |

The use of sulphate of the aluminium type $Al_2(SO_4)_3 \cdot nH_2O$ in a solution with a density ranging from 1.05 to 1.10 g/cm$^3$ (1.07) allows the larger chips to be defibrillated, and the use of sodium silicate $Na_2O \cdot nSiO_2$ with a $SiO_2/Na_2O$ ratio=3.19 to 3.53 in a solution with a density ranging from 1.10 to 1.15 g/cm$^3$, will help both as regards the acceleration of the mixture's setting time and the mineralization of the wood chips.

The water to be used shall be clean (colourless and odorless), preferably drinking water, and free from oils or other impurities which might contaminate the colour of the concrete, so as to comply with the provisions of the EN 1008.

The pigments suitable to the manufacture of the said mixture shall be inorganic and have the desired colour.

The manufacturing of the board is in accordance with the industrial process of the previously mentioned Viroc panel, in an appropriate installation. It comprises a wood treatment step, with debarking, cutting and defibrillation to the previously referred dimensions, followed by mixing of the constituents for at least 90 s in an industrial mixer, followed by the conformation of the board using a conformation equipment, followed by pressing for the purposes of dimensional stabilization. Subsequently, it is cured in a hardening chamber, air-matured and finally dried in a drying tunnel. After this, the plate is cut, rectified and packed.

EXAMPLES

The following are some of the possible examples regarding the preparation of panels. These examples are designed to merely illustrate the invention, without in any way limiting the scope of the same.

Example 1

Panels were prepared with the following components and according to the stated dry weight percentages of material:

| Step | Component | Weight % |
|---|---|---|
| 1 | Pinewood chips (⅔ < 1 mm and ⅓ [1; 4] mm) | 15.4 |
| 2 | Aluminium sulphate solution with density of 1.07 g/cm$^3$ | 4.1 |
| 3 | Sodium silicate solution with density of 1.13 g/cm$^3$ | 6.3 |
| 4 | Grey cement CEM II/A-L 42,5R | 62.8 |
| 5 | Gypsum | 11.5 |

Manufacturing Steps

The logs of wood are reduced into chips. The latter are thinned and divided into a group of larger chips with 1 to 4 mm and another group of thinner chips with a thickness lower than 1 mm. The chips are introduced in the mixer wherein after 30 seconds half of the water required for the process is also introduced (this varying according to the equipment used) and after another period of 30 seconds, the remaining portion of water is added. Again after 30 seconds, the aluminium sulphate is introduced and then, after 60 seconds, the sodium silicate solution.

The cement and the gypsum are premixed for 60 s, and then added to the remaining constituents in the main mixer.

The mixture's conformation step is started, in which the said mixture is distributed with an even thickness over steel plates, thus forming a mattress. A stack of alternate plates and mattresses is formed with a number of stages according to the thickness of the boards to be manufactured. The stack is pressed and introduced in a hardening chamber, in which, under the effect of pressure, temperature and humidity and length of stay, it will gain the required strength in order to be handled.

This set of boards is decompressed and the boards are separated from the plates. The panels are subjected to a precut operation and subsequently they are stacked and left to mature in a covered park. After maturation, the boards are introduced in the drying tunnel in order to remove the excess moisture.

At the final step, the boards are cut to the desired size and treated in the surface.

Example 2

According to the same process described in the Example 1, except in what concerns the calcium carbonate, which is processed together with the cement and the gypsum, panels were prepared with the following components and weight percentages:

| Step | Component | Weight % |
|---|---|---|
| 1 | Pinewood chips (²⁄₃ < 1 mm and ⅓ [1; 4] mm) | 16.1 |
| 2 | Aluminium sulphate solution with density of 1.07 g/cm³ | 4.3 |
| 3 | Sodium silicate solution with density of 1.13 g/cm³ | 5.8 |
| 4 | Grey cement CEM I42,5R | 47.4 |
| 5 | Gypsum | 16.1 |
| 6 | Calcium carbonate | 10.3 |

Use of the Product of the Invention

The most common applications for this panel are:
Building Façades:

The use of this type of panels in façades offers several benefits due to the fact that it is a building material which can be used on outer spaces as well, with a good behaviour while enduring sun exposure, wet and dry cycles of rainwater, freeze and thaw cycles, and also due to its acoustic and mechanical strengths, in addition to its easy application and workability, which enables it to be applied as is, or a finishing can be adopted such as painting or coating with ceramic materials.
Walls:

Another possible application is for the purpose of building structural or dividing walls, both in inner and outer spaces.

Its characteristics of mechanical strength, thermal strength and resistance to fire action, when applied with a support and fixing system, may represent a good solution.

In effect, the mechanical strength, durability and easy maintenance of the panels make them an excellent solution for the coating of inner spaces in buildings with high affluence of people (public buildings). On the other hand, inner wet areas can also be suitable spaces for using this type of panel due to its good behaviour concerning humidity, such as in the case of bathing facilities and sanitary installations in general.
Pavements:

The excellent features of mechanical strength, resistance to airborne sounds and percussion sounds, thermal strength, resistance to fire action, as well as to fungi, termites and other microorganisms, allow them to satisfy the specific requirements of pavements construction, when applied in an appropriate support system.
Ceilings:

Another possibility consists in the use of these panels as false ceilings, wherein excellent results can be obtained as regards durability and aesthetic aspects.
Roofings:

Being a non-deteriorable material when exposed to outer environments, it can be used as the finishing final coating, which naturally requires the implementation of a damp proofing system in order to ensure it remains watertight.
Lost Formwork:

Its characteristics of rigidity, resistance and durability will allow this panel to be used in the field of lost formworks.
Other Applications:
  Interior decoration.
  Sound barriers.
  Street furniture and indoor furniture
  Pallets Characteristics of the Product of this Invention The main characteristics of the product of this invention are listed in the following table:

TABLE 2

| Characteristic | Performance |
|---|---|
| Characteristics of the panels | |
| Density | 1500-1600 kg/m³ |
| Thermal conductivity | k = 0.23 W/m² · K |
| Surface alkalinity | pH = 11-13 |
| Modulus of elasticity in bending | 6000 MPa |
| Tension parallel to the plane | 5.00 MPa |
| Tension perpendicular to the plane | 0.60 MPa |
| Tension under bending | 10.5 MPa |
| Compression parallel to the plane | 15.0 MPa |
| Compression perpendicular to the plane | 40.0 MPa |
| Transverse stress | 2.00 MPa |
| Water vapour diffusion resistance factor | μ = 30 (wet method) μ = 50 (dry method) |
| Fire Resistance | A2-S1-d0 - EN 634.1/EN 13501-1/DIN 4102-1 M0 - NF P 92-501 A - ASTM E136-1 |
| Acoustic properties | |
| Sound reduction index | Rw from 31 to 37 dB depending on thickness |
| Sound absorption coefficient | α = 0.10 to frequencies of 250-500 Hz |
| Dimensional stability | |
| Maximum longitudinal and transverse variation | 0.7% between extreme amplitudes of air relative humidity |
| Thickness variation | 1.5% - thickness variation after water immersion for 24 h |

The invention claimed is:

1. An incombustible composite panel of high performance, made from Portland cement, gypsum and wood particles, comprising in weight percentage of the components with reference to the dry weight of the composition:
  1) 35 to 85% of grey or white Portland cement;
  2) 10 to 20% of debarked resinous wood particles;
  3) 10% to 20% of semi-hydrated calcium sulphate;
  4) 2 to 6% of a surface accelerator;
  5) 2 to 6% of aluminium sulphate solution;
  6) 0 to 30% of calcium carbonate; and
  7) 0 to 15% of pigments.

2. The composite panel according to claim 1, wherein the resinous wood used in order to obtain the component 2) is pinewood.

3. The composite panel according to claim 1, wherein that the wood particles used as the component 2) are in the form of chips.

4. The composite panel according to claim 3, wherein the thickness of the said chips ranges from 0.25 to 0.32 mm.

5. The composite panel according to claim 3, wherein 50 to 70% of the said chips are <1 mm long, and 26 to 40% of the said chips have a length of 1 to 4 mm.

6. The composite panel according to claim 1, wherein the surface accelerator used as the component 4) is sodium silicate solution with a density ranging from 1.10 to 1.15 g/cm³.

7. The composite panel according to claim 6, wherein the sodium silicate has a $SiO_2/Na_2O$ ratio between 3.19 and 3.53.

8. The composite panel according to claim 1, wherein the aluminium sulphate used as the component 5) has a density between 1.05 and 1.10 g/cm³.

9. The composite panel according to claim 1, wherein the pigments used as the component 7) are metal oxide pigments.

10. The composite panel according to claim 1, having a tensile strength under bending >9 N/mm², a tensile strength perpendicular to a plane >0.5 N/mm² and an elasticity modulus >4000 N/mm².

11. The composite panel according to claim 1, having a thermal conductivity of <0.23 W/m²·K.

* * * * *